Patented Jan. 19, 1937

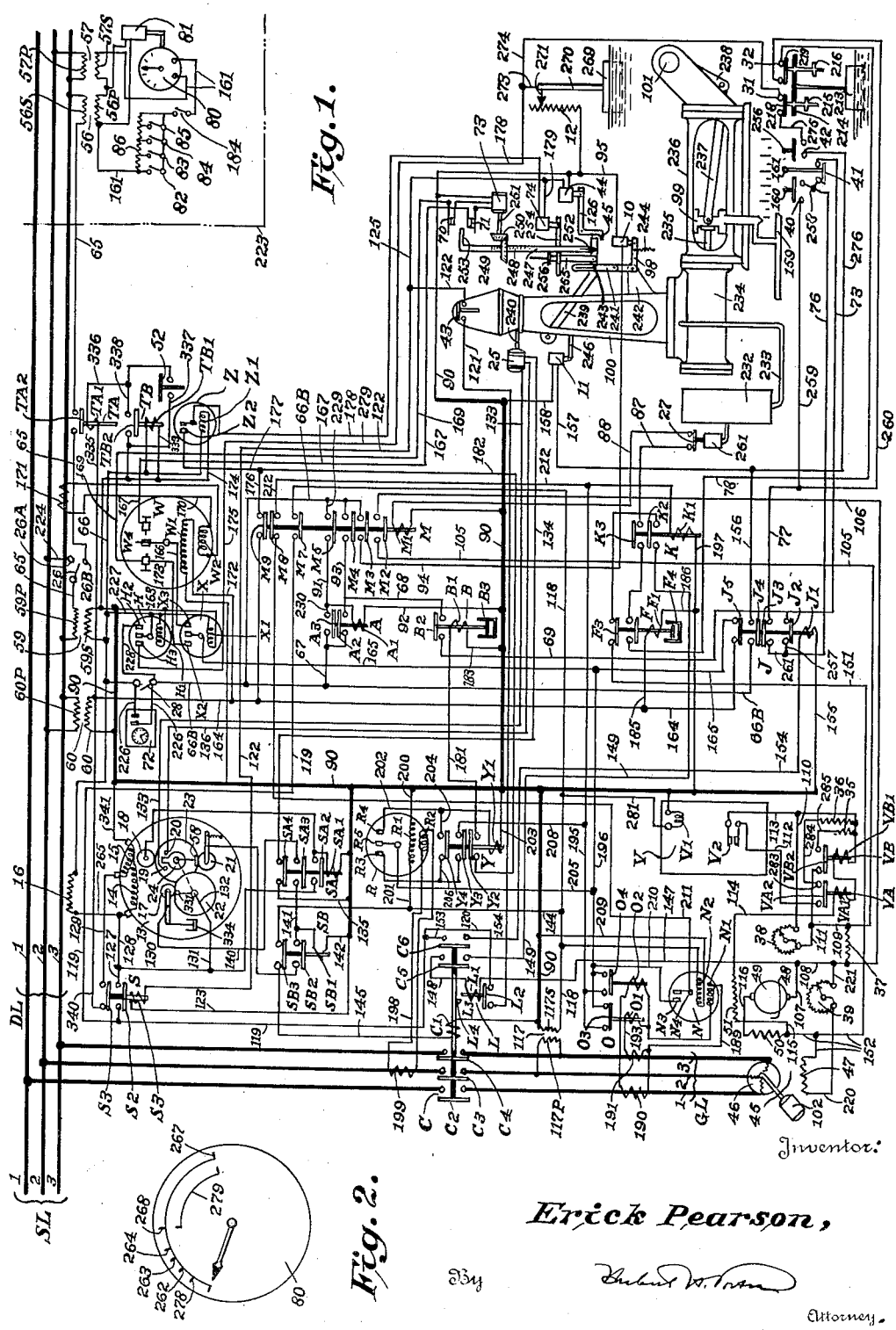

2,067,944

UNITED STATES PATENT OFFICE 2,067,944

SYSTEM FOR THE REMOTE OPERATION OF POWER PLANTS

Erick Pearson, Minneapolis, Minn.

Application February 24, 1931, Serial No. 517,675

22 Claims. (Cl. 171—118)

This application is a continuation in part of my application for patent on system for automatic parallel coupling of synchronous alternating current machines, filed September 24, 1926, Serial No. 133,645.

My invention relates to power plants and to the actuation and control of generators therein and has for an object to provide a system whereby a generator may be completely controlled automatically from a remotely situated control station.

Another object of the invention resides in providing a system in which the operator may be at all times apprized of the condition of the power plant and of the state of actuation or operation of the various machinery therein.

An object of the invention resides in providing a plurality of devices for actuating and controlling the machinery and equipment of a power plant and for controlling the starting and operation of a generator and synchronizer of the power plant, said devices having electric circuits and in further providing a meter responsive to the flow of current in said circuits for indicating the condition or state of actuation or operation of the generator and synchronizer or other equipment.

Other objects of the invention reside in utilizing a control current for controlling the actuation and operation of the generator and synchronizer of relatively high potential and in providing a control line and in further using one wire of the transmission system as one side of said control line.

Another object of the invention resides in effecting the actuation and control of certain of the elements of the power plant by varying the control potential at the control station.

A still further object of the invention resides in providing time controlled means for starting and stopping the generator unit at any desired predetermined time of the day.

A feature of the invention resides in providing a safety device for preventing the automatic restarting of a unit after the same has been shut down until the system is manually started and the operator given an opportunity to check the cause for the automatic stopping of the system.

An object of the invention resides in providing a limit device operable in conjunction with the governor of the prime mover of the generator to limit the gate opening for controlling the speed of the prime mover until the speed control of the governor becomes operative.

Another object of the invention resides in providing centrifugally controlled means actuated by the speed of the generator for controlling the synchronizing and the connecting of the generator to the system.

An object of the invention resides in providing a voltage controlling device for the generator, including a voltage regulator energized from the generator voltage and controlling the exciter current, and in providing relays in combination therewith for shunting part of the exciting current from the regulator at predetermined load conditions.

A still further object of the invention resides in employing a voltage regulator for controlling the generator field excitation so as to maintain a fixed potential across the generator generating winding during the synchronizing and operation of the generator.

Another object of the invention resides in providing a master relay for controlling the operation of the generator and all accompanying devices.

An object of the invention resides in employing in conjunction with the circuit breaker and the fluid control for the prime mover of the generator, two switches, the switch for the fluid control being adapted to open and close, depending upon the condition of the fluid, one of said switches being normally open and the other of said switches being normally closed and in arranging said switches in interlocking parallel relation in the circuit of the master relay in controlling the operation of the generator.

Another object of the invention resides in providing a solenoid, operating in conjunction with the fluid control of the governor for the prime mover, adapted to limit the opening of the fluid control to cause the generator to assume a predetermined partial load.

A still further object of the invention resides in providing a device for regulating the output of the generator connected to a power line according to the direction of flow of the current in the power line and in employing a watt meter having switches therein, adapted to be alternately operated in accordance with the direction of flow of power in the power line for effecting such regulation.

Another object of the invention resides in providing a device for controlling the output of a generator connected to a power line in accordance with the energy supplied to the power line through other sources.

Another object of the invention resides in providing a protective device for preventing the subsequent connecting of the generator to the distribution line in the event that any of the functions of the starting and connecting devices fail to operate within a predetermined limit of time.

An object of the invention resides in providing a protective device operating to shut down the generator in the event that there be failure of current for energizing the various protective devices.

A feature of the invention resides in providing a protective device for shutting down the generator in the event of failure of the exciter to generate current for exciting the fields of the generator.

A still further object of the invention resides in providing a protective device for shutting down the generator when the height of water at the water wheel drops below a predetermined elevation.

An object of the invention resides in providing a protective device for shutting down the generator in the event of reversal of power in the generator line or in the event that the load carried by the generator drops below a predetermined amount.

Another object of the invention resides in providing means for normally shutting down the plant which includes apparatus for opening the circuit breaker at such time as there shall be no load on the generator to prevent arcing at the circuit breaker contacts.

A still further object of the invention resides in providing a float, disposed in the flume of a water turbine for operating the generator and between the intake and water wheel and to further provide means operating in conjunction therewith to shut down the generator when the elevation of the water within the flume drops below a predetermined height.

An object of the invention resides in providing a float within the flume of the water turbine and in providing indicating means operated thereby for indicating the condition at the screen of the turbine intake to advise whether or not trash has accumulated at the screen to such an extent as to decrease supply of water to the turbine.

A still further object of the invention resides in providing a float for indicating the condition of the head water and in further providing a circuit connected therewith and connected to said circuit and to said previously named circuit for operating said indicating meter, said first named circuit being operated when the generator has taken its share of the load.

An object of the invention resides in providing indicating means for indicating that the governor has been moved to load taking position.

Other objects of the invention reside in the novel combination and arrangement of parts and in the details of construction hereinafter illustrated and/or described.

In the drawing:

Fig. 1 is a wiring diagram illustrating an embodiment of my invention.

Fig. 2 is an elevational view of the face of one of the meters used in the invention shown in Fig. 1.

My invention is intended for the remote control and operation of a sub-station for generating electrical energy. Such an installation usually includes a distribution line or network fed by a number of sub-stations having individually operated generators therein. In the operation of such systems, it becomes desirable to control and operate the sub-stations from a certain control station. Such a control station may be situated at one of the power plants or at an entirely different locality. In the particular installation shown in the drawing, the control station is illustrated as located along the distribution line.

For the purpose of illustrating the application of the invention, I have shown a distribution line which has been designated by the reference characters DL, the three phases thereof being marked 1, 2 and 3. In a similar manner a generator line has been shown which is indicated by the reference characters GL and its phases referred to by numerals 1, 2 and 3. The generator line is provided with a circuit breaker C by means of which the same may be directly connected to the distribution line DL. The distribution line as shown in Fig. 1 is at the right of the generator line. At the left of the generator line is shown a service line SL having phases 1, 2 and 3 which serve the local demand desired to be taken care of by the generator.

The source of current for the generator line GL consists of a three phase synchronous generator 45 which is provided with a three-phase armature 46 directly connected to the phases 1, 2 and 3 of the generator line. This generator may be driven through any suitable source of power such as steam, electricity, or water. In the present disclosure a turbine having a water wheel diagrammatically designated at 102 is employed which may be of any suitable type. The flow of water to this water wheel is controlled through a governor 100 which will be presently described in detail. The generator 45 further includes a field coil 47 which is separately excited from an exciter 48.

The exciter 48 comprises an armature 49, a series field coil 50, and a shunt field coil 51. These parts are connected to the generator field coil 47 and other equipment as follows: One side of the series field coil 50 is connected through a conductor 116 with one side of the armature 49. The other side of the exciter series coil is connected by a conductor 115 to the shunt exciter field coil 51, and also to the field coil 47 of generator 45 through a conductor 152. The other side of the field coil 47 is connected through a conductor 220 to a rheostat 39 which is further connected through a conductor 221, a conductor 103 and another conductor 107 to the other side of the exciter armature 49. The shunt field coil 51 of exciter 48 is connected through a conductor 114 and through other conductors 113 and 110 with a rheostat 38. A conductor 111 is connected to rheostat 39 which in turn is connected to a conductor 109 leading from a resistance 37. The resistance 37 is connected to the conductor 103 whereby it finally finds a return to the armature 49 through conductor 107. This completes the exciter circuits which operate in the customary manner and which are controlled through the rheostats 38 and 39 to produce the desired voltage across the field coil 47 of generator 45.

In Fig. 1, at the upper right hand corner, a dotted line indicated by reference character 222 will be found. All of the equipment and apparatus to the left of and below this line is located in the sub-station where the generator 45 is situated. All of the apparatus to the right of and above this line is located in the control station which is remotely disposed from the sub-station.

For the purpose of starting the turbine 102 the governor 100 is employed. This governor may be of any desired type. For the purpose of illustration, the governor shown is of the centrifugal type having fly balls adapted to control suitable valves to introduce fluid under pressure from a tank 232 through a pipe line and into a cylinder 234. The fly balls operate against the pressure of a spring whose tension may be varied by the rotation of a shaft 240 driven from an electric motor 25. When the shaft 240 rotates in one direction the pressure exerted by the spring is lessened to cause a decrease in gate opening and when the shaft 240 is rotated in the other direction the pressure of said spring is increased to cause an increased gate opening. The motor 25 is adapted to be rotated in either direction through two separate circuits energizing the same. The cylinder 234 has the usual piston therein (not shown) which is connected to a piston rod 235 which operates a cross head 99 slidable in the guide 236. The cross head 99 has pivotally connected to it a connecting rod 237 which is pivoted to a crank 238. The crank 238 is secured to a shaft 101 directly connected to the gate (not shown) which controls the flow of water to the water wheel or prime mover 102.

The governor 100 includes a limit lever 239 which independently limits the movement of the valve control apparatus operated by the fly balls and the subsequent opening of the gate controlling the flow of water to the water wheel. When this lever is depressed, the ultimate gate opening is greater than when the lever is raised and when the lever 239 is raised the maximum amount, the gate is completely shut and the water wheel deprived of water.

The starting and stopping of the prime mover 102 is accomplished through the limit lever 239 of the governor 100 which in turn controls the gate opening. This is accomplished by means of a bell crank 98 pivoted to a bracket 242 on the governor proper. This bell crank has pivoted to it a slotted link 241 which engages a pin 243 along the lever 239. When the bell crank 98 is swung to bring the link 241 in alignment with the arm thereof to which the same is connected, the lever 239 is raised an amount sufficient to cause the complete closure of the gate. When the bell crank 98 is released, the link 241 is lowered and the length of the slot therein is sufficient to permit the lever 239 to function in its ordinary intended manner without interference. For swinging the bell crank 98, a solenoid 10 is employed whose plunger is pivotally connected to said bell crank. The bell crank 98 is normally held in the position shown in Fig. 1 through a tension coil spring 244 and may be moved into its freeing position through the action of the solenoid 10.

To bring the generator up to synchronous speed as rapidly as possible and to prevent the same from passing synchronous speed a device is employed which becomes effective prior to the action of the fly balls and operates in a positive manner to limit the speed of the generator. This device comprises a latch lever 126 provided with a catch 245 at the end thereof adapted to engage the limit lever 239 to hold the same at a position which would produce substantially synchronous speed of the generator. This latch lever is normally so positioned that the catch 245 thereof lies in the path of movement of the lever 239 and serves to limit the downward movement of said lever when the bell crank 98 is released through the solenoid 10. The latch lever 126 may be operated through a solenoid 44 to withdraw the catch 245 thereon from the path of movement of the latch 239 so as to permit said lever operating in its intended manner when the governor is under control of the fly balls.

To cause the generator to take on load after the same has been synchronized and connected to the distribution system, a solenoid 11 is employed which is connected to a lever 246. This lever serves to increase the pressure exerted by the spring on the fly balls and cause a corresponding opening of the gate. The lever 246 is so arranged that an increase of pressure on the spring occurs when the solenoid 11 is energized.

For regulating the load taken by the generator, a slotted shaft 247 is employed which is slidably connected through a pin 252 to the lever 239. This shaft is threaded at 248. A bevel gear 249 is screwed upon the threads 248 of shaft 247 and may be driven through a bevel gear 250. The bevel gear 250 is mounted upon a shaft 251 which is driven from a motor 73. The motor 73 is provided with two circuits so that the same may be rotated in either direction whereby the shaft 247 may be raised and lowered to provide the desired stop for limiting the movement of the limit lever 239. For terminating the operation of the motor 73, two limit switches 70 and 71 are provided which are connected in the respective circuits controlling this motor. These switches are disposed in the path of movement of an arm 253 secured to the shaft 247 and stop the motor when the limit lever 239 has arrived at the proper setting.

In the operation of power plants, it frequently becomes desirable to cause the generator to assume a predetermined load less than its maximum load. In order to be able to accomplish this result automatically, I provide a swinging lever 254 which is pivoted to some suitable support. This lever may be reciprocated through a solenoid 74 whose plunger is pivoted to said lever. Pivoted to the limit lever 239 is a screw 255 which passes loosely through the lever 254. This screw has threaded upon it a nut 256 which when the lever 239 reaches the predetermined position engages the lever 254 and limits the further movement of said lever thereby holding the gate at a suitable opening to cause the generator to take the proper portion of the load. When the solenoid 74 is de-energized the screw 255 is free from said lever and said limit lever 239 may operate independently thereof as previously described.

For providing power for operating the various devices utilized both in the control station and in the sub-station, a number of transformers are employed. A transformer 57 having a primary 57P and a secondary 57S is situated in the control station and is connected across phases 2 and 3 of the distribution line DL. This transformer furnishes remote control current for actuating the various apparatus situated in the sub-station. In the sub-station a transformer 60 is employed which is constructed with a primary 60P and a secondary 60S. The primary 60P is directly connected across phases 2 and 3 of the distribution line DL. This transformer furnishes station control current for operating certain of the control devices of the invention. In addition to these transformers, another transformer 117 is employed which is situated in the sub-station and which is provided with a primary 117P and a secondary 117S. The primary 117P of this transformer is connected to phases 2 and 3 of the generator line GL. This transformer serves to provide generator potential for operating the synchronizing mechanism of the invention and for other purposes to be subsequently explained. One side of the secondary 60S of transformer 60 and one side of the secondary 117S of transformer 117 are connected together through a common bus 90 from which a number of the devices to be hereinafter described receive power. This bus is shown in heavy lines in Fig. 1. The other side of the secondary 60S is connected to a bus 164 which I have termed the station control bus. The other side of secondary 117S of transformer 117 is connected to a bus 118 which I have termed a generator potential bus. In tracing the various circuits of the invention, the circuits will be traced from and to these various buses without reference being made to the source of power connected thereto.

For controlling the operation of the system from the control station, a remote control line 65 is employed which runs parallel with the distribution line and connects the sub-station with the control station. This remote control line comprises a single conductor which is connected at its ends to phase 3 of the distribution line DL, which forms a return for the same. In this line is inserted the secondary 56S of a step-up transformer 56 which is located in the control station, and also the primary of step-down transformer 59. When voltage is impressed upon the primary 56P of step-up transformer 56, the same is transmitted through the line 65 and phase 3 of distribution line DL to the step-down transformer 59. One side of the secondary 59S of step-down transformer 59 is connected to the common bus 90 of transformers 117 and 60 while the other side of the secondary of this transformer is connected to a bus 66 which I have termed a remote control bus. The current delivered by the transformer 59 serves to operate certain parts of the equipment as will subsequently be more fully described.

For providing voltage for the step-up transformer 56, a circuit 161 is employed which includes the primary 56P of step-up transformer 56 and which is connected across the secondary 57S of the transformer 57. This circuit also includes a starting switch 184, and a resistance 86 the function of which will be subsequently explained in detail. In the starting of the sub-station, it is hence merely necessary to close switch 184 which impresses voltage upon the primary 56P of transformer 56 which in turn energizes transformer 59 delivering power to the common bus 90 and the remote control bus 66 in the sub-station. The various devices operated thereby are then automatically set into operation as will be presently explained to perform the various functions for which they are intended.

In the remote control line 65 and within the substation is located a two-way switch 26 which is provided with two contacts 26A and 26B. The contact 26B is connected in the line 65 so that when the switch 26 is operated to close this contact, the line 65 is closed. The other contact 26A is connected through a conductor 224 with phase 2 of distribution line DL and serves to energize the transformer 59 directly from the distribution line. Switch 26 is manually operated and is for the purpose of permitting the control of the sub-station either from the sub-station or from the control station. In the subsequent description of the invention, the switch 26 has been assumed as closing contact 26B so that the station may be operated by remote control.

In the operation and control of the sub-station at the control station, certain of the desired results are accomplished by impressing various voltages upon the primary 56P of transformer 56 which in turn are caused to operate different potential relays, each set to become operative at certain different voltages. For procuring the desired voltage upon the primary 56P of the step-up transformer 56, the resistance 86, previously referred to, is employed. This resistance is divided into a number of sections which may be shunted through a number of shunting switches 82, 83, 84 and 85. By closing any one of these switches a different potential may be secured whereby the various devices will be operated.

The remote control bus 66 is connected to a branch bus 66B through a number of parallel switches 72, 28 and H2. The switch 28 is a manual switch and is used when the switch 26 is connected to close contact 26A and when the sub-station is to be controlled manually at the sub-station. The switch 72 is a clock control switch and is adapted to connect branch bus 66B to bus 66 at any predetermined time for which the clock may be set and also serves to open the circuit at any other predetermined time for which the clock may be set. This switch is connected through conductors 226 to the remote control bus 66 and to the branch bus 66B. The switch H2 is part of a potential relay H which includes a potential coil H1 by means of which the relay is operated and also another switch H3 for a different purpose to be later described. The switch H2 is connected through conductors 227 and 228 with the bus 66 so that all three of these switches are in parallel and may operate to connect the branch bus to the remote control bus. The potential coil H1 is connected to the remote control bus 66 through the conductor 227. This coil is further connected through a conductor 163 with the common 90. When the proper voltage is impressed upon the primary 56P of the transformer 56 by the closing of the proper switch shorting the resistance 86, potential coil H1 is energized and draws the pointer thereof toward the right to close switch H2 and to connect branch bus 66B to remote control bus 66. In this manner control may be had in the sub-station either by remote control or through the clock switch or by the manual switch.

For the purpose of controlling the operation of the sub-station and the starting of the generator and the connecting the same into the distribution line, a main or master relay is utilized which is indicated in its entirety at M. This relay includes six normally open switches M2, M3, M4, M5, M7 and M9 and a normally closed switch M8, the use of which will be presently described. Relay M is operated through a circuit which is energized by the control circuit from the control station through switch 184. This relay controls numerous circuits which will be presently described in detail. When this circuit is opened all of the apparatus in sub-station is disconnected and the sub-station shut down.

For the purpose of connecting the generator line GL to the distribution line DL, a circuit breaker C is employed. This circuit breaker may be of any desired type and is provided with a coil C1 by means of which the same is operated, and with three switches C2, C3 and C4. These switches are of suitable design to carry the current from the generator and are adapted to connect the generator line GL to the distribution line DL. In addition to these switches the circuit breaker C is provided with two other switches C5 and C6, which have individual functions to be later described in detail. The circuit breaker C is normally urged into open position through gravity or a spring (not shown), and is adapted to be held in closed position through a latch relay L having a coil L1 and a normally closed switch L2. The plunger L3 of this relay is adapted to engage a latch lug L4 on the circuit breaker C which serves to hold the same in closed position. When the coil L2 is energized, the plunger L3 thereof comes into engagement with the latch L4 and holds the relay closed. At the same time, the switch L2 is opened. In the particular system, a number of switches are required to be closed upon closure of the circuit breaker. Due to the impracticability of multiplying the switches on the circuit breaker, an auxiliary relay J has been employed which is provided with a coil J1, three normally open switches J2, J4 and J5, and a normally closed switch J3. The coil J1 of this switch is connected through a conductor 155 with the common bus 90 and through another conductor 154 with switch C6 of circuit breaker C. This switch is connected through a conductor 120 with conductor 119, which conductor is connected to the switch M7 of main relay M. Switch M7 in turn is connected to bus 118 from transformer 117. It hence becomes apparent that as soon as the circuit breaker is closed, switch J is operated, closing the various switches thereon and operating to supplement the action of the circuit breaker. It is to be noted that relay J is operated from the potential of transformer 117 so that this relay does not go on unless the generator is in operation and producing sufficient potential to actuate said relay.

For the purpose of synchronizing the generator with the distribution line, an ordinary synchroscope is employed which is diagrammatically indicated at 13 in the drawing. This synchroscope may be of any desired type and is provided with two coils 14 and 15 operating in the usual manner. The synchroscope 13 is further provided with a shaft 132 which has mounted on it, two discs 22 and 23 of insulating material. The disc 22 is provided with a contact 331 which is disposed on a flat spot of said disc. The disc 23 is provided with a contact 58. Operating in conjunction with contact 331 is a roller 17 which is swingably mounted to follow the contour of the disc 22. The movement of this roller in following the surface of the disc 22 is retarded through a dash pot or similar timing device indicated at 334. When the disc 22 rotates at the proper speed, the roller 17 may follow the flat spot 55 and make contact with the contact 331. When, however, the disc 22 travels too fast the roller 17 on leaving the circular portion of the periphery of the disc 22 moves inwardly toward the flat spot 55 but does not reach said flat spot until the contact 331 has already passed the position at which it might have been engaged by said roller. Operating in conjunction with disc 23 are two rollers 21 and 18 spaced 180° apart which are alternately adapted to engage the contact 58.

For starting the synchronizing device, a synchronizing relay S is employed which comprises a coil S1 and two normally open contacts S2 and S3. In addition to this relay, a safety relay SA is employed and an auxiliary relay SB which operate the circuit breaker C after synchronism has been attained. The relay SA comprises a coil SA1 and three normally open contacts SA2, SA3 and SA4. The relay SB comprises a coil SB1 and two normally open contacts SB2 and SB3.

The various devices of the synchronizer are connected together as follows. Current for operating the synchronizer 13 is had from transformer 117 and from transformer 60. A conductor 340 is connected to the bus 164 and to one side of switch S3. Another conductor 129 leads from the other side of this switch and to one side of coil 15. Both coils 14 and 15 are connected together and are connected through a conductor 341 to the common bus 90. Through this circuit, potential is had for coil 15 from transformer 60P. In like manner a conductor 128 is connected to coil 14 and to another conductor 127 which in turn is connected to switch S2 and through a conductor 119 with switch M7 of main relay M which in turn is directly connected to bus 118 leading from transformer 117. When relays M and S are closed, current is provided for both coils 14 and 15 and the synchroscope actuated, which rotates shaft 132.

The relay S is operated through the following circuit. A conductor 123 connects coil S1 with the common bus 90. Another conductor 122 connects the other side of coil S1 with switch 43 on governor 100. This switch is a centrifugally operated switch controlled through the fly balls of the governor and becomes operative to close the circuit through coil S1 when the generator reaches substantially synchronous speed. A conductor 121 connects switch 43 with switch L2 of latch relay L which switch has connected to it a conductor 120 which is connected to conductor 119, said latter conductor being connected to switch M7 and through conductor 118 to transformer 117. Since switch L2 is normally closed, closure of switch 43 when the governor comes up to speed and after the main relay M is closed, actuates coil S1 and closes contacts S2 and S3. At the same time a shunt circuit is completed through a conductor 125 leading from conductor 122 at the governor and connected to the common bus 90. This circuit includes the magnet 44 which releases the latch 126 operating in conjunction with the limit lever 239 controlling the oil valves of the governor 100. The latch 126 serves as a limit for controlling the opening of the gate to bring about a predetermined no-load speed of the generator. As soon as such speed is attained, the switch 43 closes and the magnet 44 energized. This causes the latch 126 to be disengaged permitting the fly balls of the governor to control the subsequent operation of the generator.

During the operation of the synchroscope 13, shaft 132 is driven which rotates the revoluble members 22 and 23. In the position of these revoluble members at which synchronism last occurred roller 18 is so positioned with reference to the contact 58 on revoluble member 23 as to be opened. After shaft 132 has rotated sufficiently to bring said contact in position to be engaged by said roller, a circuit through said contact and roller may be traced. This circuit includes a conductor 127 which is connected to switch S2 and derives energy from transformer 117 through conductors 119 and 118. A conductor 130 connects this conductor with another conductor 131 which is directly connected to the shaft 132. Shaft 132 in turn is connected to both contacts 331 and 58. A conductor 137 leads from roller 18 to switch SA2 and connects with the coil SA1 of relay SA through another conductor 138. This coil is connected through a conductor 342 with the common bus 90. Closure of this circuit operates relay SA which closes switches SA2, SA3 and SA4. A conductor 139 is connected to conductor 131 and to switch SA2 maintains the circuit through coil SA1 and holds the relay closed. Upon closure of these various circuits speed matching commences.

Upon the shaft 132 is mounted a contact 24 which in turn is frictionally driven through said shaft and which is adapted to move in either direction depending upon the rotation of the shaft. This contact is adapted to engage either of two fixed contacts 19 or 20 disposed on either side thereof. When once the contact 24 engages one of these contacts it slips relative to the shaft and maintains the circuit therethrough closed during the rotation of the shaft in the particular direction. These contacts control the operation of the motor 25. This motor is reversible and may be constructed with separate windings for rotating the armature thereof in either direction or other reversing means may be employed. The contact 19 is connected through a conductor 133 with one of the windings of motor 25. The contact 20 is similarly connected through a conductor 136 with the other winding of the motor 25. The common terminal of motor 25 is connected through a conductor 134 with the switch SA4 which in turn is connected through a conductor 135 with the common bus 90. As soon as the synchroscope 13 is actuated, the same commences to rotate, rotation being in one direction or the other depending upon whether the generator frequency is above or below that of the distribution system. In either event one or the other of the contacts 19 or 20 is engaged by contact 24. Assuming the contact 24 to be in contact with contact 19 the current flows from the transformer 117 through various circuits connected therewith and previously described, through shaft 132, through contact 24, through contact 19, through conductor 133, through one of the windings of motor 25, through conductor 134, through switch SA4, through conductor 135 to the common bus 90. Motor 25 is now rotated to adjust the spring tension upon the fly balls of governor 100 and to adjust said governor to cause the generator to pick up speed or slow down as may be required until the frequency of the generator is the same as that of the distribution system. Where the differences in frequencies is opposite from that described, the contact 24 will move in the opposite direction to engage contact 20 which is connected with conductor 136 with the other winding of the motor 25. This reverses the motor and reverses the tension upon the governor spring causing the governor to function in exactly the opposite manner. In this manner the speed of the generator is varied until the frequencies of the generator and the distribution line are the same.

The roller 17 is connected through a conductor 140 with the switch SA3 which is connected through a conductor 141 with coil SB1 and also switch SB2 of relay SB. This coil is further connected through conductor 142 with the common bus 90. This roller 17 operates as follows: As previously brought out, switch 17 is time controlled through the dash pot 334 or a similar timing device and is adapted to make contact with the contact 331 on rotary member 22 only when said member rotates at a sufficiently slow rate of speed. When such condition occurs, current may be traced from the conductor 127 through conductor 130, conductor 131, shaft 132, contact 331, roller 17, conductor 140, switch SA3, conductor 141, through coil SB1 and conductor 142 back to the common bus 90. This energizes relay SB closing contacts SB2 and SB3. The contact SB2 of relay SB is connected through a conductor 143 with roller 21. The other side of this switch is connected to conductor 141. Switch SB3 is connected through a conductor 144 with the bus 118 leading from transformer 117. The other side of this switch is connected through a conductor 145 with the coil C1 of circuit breaker C. The other side of coil C1 is connected through a conductor 146 with the common bus 90. When the relay SB is closed a circuit is also closed from shaft 132 through contact 58, roller 21, through conductor 143, through switch SB2 and through conductor 141, providing a shunt circuit for maintaining relay SB closed. The peripheral extent of the contact 331 on member 22 closing roller 17 is very short to give precision in the closing of the circuit breaker at synchronism. To give sufficient time for the performance of this function, the contact 58 on rotary member 23 engaging roller 21, is somewhat longer, giving sufficient time to close the circuit breaker. The time procured is just sufficient to initially close the circuit breaker and in the event that the circuit breaker for any reason, such as the occurrence of a surge in the line does not close, the current through relay SB is not maintained, and said relay opens, requiring a repetition of the procedure. When, however, conditions are proper, current is established through the coil C1 of circuit breaker C for a sufficient length of time to cause the closing of this circuit breaker and the latching of the same in closed position. The circuit for this purpose may be traced as follows: Commencing with conductor 118 from secondary 117S of transformer 117, a circuit may be traced through conductor 145, through coil C1 and through conductor 146 back to the common bus 90. This closes the circuit breaker.

Operation of the circuit breaker closes switch C5, which operates the latch relay L. The circuit for the operation of this relay derives energy from the exciter 48. This circuit includes two relays F and K whose functions will be later more fully described. The relay K comprises a coil K1 and two normally closed switches K2 and K3. The relay F comprises a coil F1 and two normally open switches F2 and F3 and is controlled through a dash pot F4. The coil L1 of relay L is connected to the exciter 48 through a conductor 147. This coil is further connected to switch C5 of the circuit breaker C through a conductor 148. A conductor 149 connects switch C5 with switch K2 while another conductor 150 connects the latter switch with switch F3. Switch F3 is connected to the exciter 48 through a conductor 152. The latch operating circuit may be traced as follows: Commencing with line 107 leading from armature 49 of exciter 48, the current passes through conductor 147, through coil L1 of relay L, through conductor 148, through switch C5, through conductor 149, through switch K2, through conductor 150, through switch F3 which is closed when provided with local operating current, through conductor 151 and back to conductor 152, which is connected to the series field winding 50 of exciter 48. This energizes the latch relay L operating said latch to hold the circuit breaker C closed. At the same time switch L2 is opened. The opening of switch L2 de-energizes relay S opening switches S2 and S3.

The closure of the circuit breaker C in addition to closing switch C5 also closes switch C6. This completes a circuit as follows: Commencing with conductor 118 connected to transformer 117, current flows through switch M7, through conductor 119, through conductor 129, through conductor 153, through switch C6, through conductor 154, through coil J1 of relay J, through conductor 155, and back to the common bus 90. This operates relay J closing switches J2, J4 and J5 and opening switch J3. Relay J is auxiliary to the circuit breaker C and simply serves to provide additional switches which might, if desired, be directly or mechanically operated through the circuit breaker instead of electrically as shown.

Before the generator can be started, it becomes necessary that certain conditions in the plant occur which are assured through a number of protective devices. Certain of these devices open normally closed switches when the required condition does not exist and other of these devices close normally open switches when the required condition ceases. The former of these switches are all included in the master relay circuit which I have termed a protective circuit and which extends between the remote control branch bus 66B and the common bus 90. This circuit includes various conductors which will presently be described.

Among the protective devices included in the protective circuit is an anti-start device which serves the purpose of preventing automatic reconnection of the plant in the event that the plant has been shut down through failure of any of the parts thereof or through operation of any of the protective devices. By means of this anti-start device it becomes necessary to de-energize the control circuit either at the control station or at the power plant before the unit can again be started and connected to the system. This is for the purpose of giving the operator supervision in starting. This device comprises a relay A which I have termed an anti-start relay which includes a coil A1, a normally closed switch A2 and two normally open switches A3 and A4. The normally closed switch A2 is in the protective circuit and is connected by a conductor 67 to the branch bus 66B and by a conductor 93 to the switch M5 of relay M. The coil A1 of this relay is connected through a conductor 92 with the common bus 90 and is further connected through a conductor 91 with switch M5 of main relay M. The switch M5 of the main relay M is in turn directly connected to the branch bus 66B through a conductor 229. The switch A2 is normally closed and when the other conditions requisite to the energization of the main relay coil M1 occur, so as to close the other switches in the protective circuit, the main relay is operated and the various normally open switches thereof closed. When switch M5 of main relay M is closed, a circuit is established through coil A1 which closes the relay A. Upon closure of this relay the current is established and the relay maintained energized through the switch A3. This switch shunts the switch M5 and is connected through a conductor 230 to conductor 91 and switch M5, and through the conductor 67 with the branch bus 66B. The protective circuit is maintained closed through the switch M4 which serves as a maintaining switch and which shunts the switch A2. This switch is connected through the conductor 93 with switch A2 and through another conductor 231 with the branch bus 66B. As soon as the master relay is closed, the circuit so procured is maintained through this switch and the switch A2 opened. Switches M5 and M4 are so set that M4 closes before M5. In the event that the generator is shut down for any of a number of causes through the various protective devices, the protective circuit is opened and the coil M1 becomes de-energized and the main relay opens. At the same time the maintaining switch M4 is opened and the circuit shunting switch A2 opened. If the cause of the shut down was only momentary as for example an overload or surge on the line, the system would immediately tend to become automatically reinstated. However, relay A prevents this since the switch A2 is now open, due to the maintaining of the relay A energized through its own maintaining switch A3. Only by opening the starting switch 184 and depriving the bus 66 of potential will the relay A1 become deenergized and the system placed in condition to be again started.

In the event that the generator is not connected to the line within a reasonable length of time due to failure of any source whatsoever, a protective device is employed which opens the protective circuit MP, energizing the coil M1 of main relay M which immediately de-energizes the entire system. This device comprises a relay B which includes a coil B1 for operating the plunger thereof and a normally closed switch B2. The relay B is time controlled through a dash pot B3 which may be set to give any desired timing for the opening of the switch B2. The coil B1 of switch B is connected through a conductor 181 with a switch Y2 of a relay Y, which switch is further connected through a conductor 182 with a conductor 176 leading from switch M9 of master relay M. The other side of the coil B1 is connected through a conductor 183 with the common bus 90. Switch Y2 being a normally closed switch current is provided for coil B1 immediately upon closing of the master relay M through switch M9 thereof. A force is then exerted by the coil B1 tending to open the switch B2. The dash pot B3 is so designed that switch B2 remains closed for a predetermined length of time after which said switch is opened. B2 as previously described is connected in the circuit controlling the coil M1 of master relay M so that upon opening of this switch the master relay M is de-energized and the entire system disconnected. When the circuit breaker is finally cut in, relay Y is operated as will be later described in detail, which opens switch Y2 de-energizing coil B1 and allowing the switch B2 to remain closed. In this manner the circuit controlling the coil M1 remains completed throughout the permissible length of time during which the generator should be connected to the distribution line.

In the event that no station control current is available from transformer 60 due to break down of the transformer or for any other reason, it becomes desirable to prevent the starting of the generator and the subsequent synchronizing and cutting in of the same. For this purpose the relay F previously referred to is employed. This relay, as stated, is time controlled and includes an operating coil F1, two normally open switches F2 and F3 and a time delay mechanism F4 in the nature of a dash pot or similar device. The coil F1 is connected through a conductor 185 with the potential side 164 of the secondary 60S of the transformer 60. The other side of the coil F1 is connected through a conductor 186 with the common bus 90 of said transformer. As long as there is potential across the secondary 60S of transformer 60, coil F1 is energized. The switch F2 of relay F is connected in the protective circuit MP previously described, which as soon as station control current is available, becomes closed through the coil F1. This completes the circuit through the coil M1 of main relay M which operates as intended. Switch F3 is connected in the circuit containing the coil L1 of the latch relay L. When switch F3 is opened, this coil is deprived of current which releases the latch to permit the circuit breaker to open. It will hence become apparent that upon depriving the coil F1 of relay F of energy that both the relay M and the circuit breaker C are opened thereby completely de-energizing all of the apparatus in the generator station when station control current is not available.

In conjunction with the governor 100, I employ further protective devices which include three switches 40, 41 and 42 which are adapted to be operated when the generator reaches certain speeds. The switch 41 is a normally closed switch while the switches 40 and 42 are normally open. These switches have operatively connected to them, rollers 160 and 161 and 256 which are adapted to be engaged by a cam member 159 movable with the cross head 99 of the governor 100 and in a direction parallel with the movement of said cross head. The switch 40 is an underspeed switch and the switch 41 is an overspeed switch and the rollers 160 and 161 of said switches are so positioned that the cam engages to operate the same at speeds below and above synchronous speed.

The overspeed switch 41 is connected in the protective circuit. This switch is connected through a conductor 75 with a conductor 69 which is in turn connected through conductors 76 and 261 with switch J3 on relay J. Switch J3 is also in the protective circuit and in series with switch 41. This switch being a normally closed switch permits the current to flow through the protective circuit and operate main relay M. However, if latch 245 should fail to function to limit the speed of the generator in starting, switch 41 would become operated when the governor was opened sufficiently to cause cam 159 to engage roller 161 and thereby open the protective circuit. To permit the generator to take on load, the switch J2 of relay J is employed. This switch shunts the switch 41, being connected to the conductor 75 and to the conductor 76 through a conductor 257, both the conductors 75 and 76 leading from the switch 41. After the circuit breaker C has been closed the relay J becomes operative, as previously described, and switch J2 is closed. The generator may then take on load without opening the protective circuit through switch 41.

The underspeed switch 40 is also in the protective circuit in series with the other switches and is connected through a conductor 258 with conductor 76. This switch is further connected through a conductor 259 with conductor 260 leading up to switch 32 to be presently referred to. Inasmuch as the switch 40 is a normally open switch, it becomes necessary to shunt this switch with a normally closed switch in order to complete the circuit through the protective circuit when the system is being started. For this purpose, switch J3 is employed, which is normally closed and which is connected through a conductor 77 with both of the conductors 259 and 260. This switch is further connected through a conductor 257 with conductor 75 leading to the other side of switch 40. As soon as the system is started, cam 159 moves into engagement with roller 160 and closes switch 40. Then after the circuit breaker is closed, and relay J closed, switch J3 opens. If, for any reason, after the generator is started the speed thereof drops below the minimum speed for which switch 40 is set, switch 40 opens and breaks the protective circuit disconnecting the entire system.

To protect against failure of pressure in the oil reservoir 232, a pressure responsive device 261 is employed which is connected to the oil reservoir 232, which provides the power for operating the valves of the governor 100. This device may be in the nature of a latch or other similar device and is adapted to move a switch 27 into closing position when the pressure in reservoir 232 reaches a predetermined number of pounds and maintains said switch closed as long as sufficient pressure occurs in reservoir 232. Upon failure of pressure within this reservoir, the switch 27 opens. Switch 27 is connected in the protective circuit and is connected through a conductor 87 with switch K3 and through another conductor 88 with the coil M1 of relay M, which in turn is connected through a conductor 89 with the common bus 90.

In addition to the various previously mentioned protective features of my invention, I employ an overload device, a shut-down device, and a reverse power device, all of which disconnect the generator from the distribution system. These devices differ from the other protective devices in that they operate to close circuits instead of opening circuits. For this reason an auxiliary relay is required through which these devices operate. This relay is the relay K which as previously stated, includes a coil K1, and two normally closed switches K2 and K3. Switch K2 is connected in the latch circuit for the circuit breaker C and upon the coil K1 being energized, opens said circuit and releases the circuit breaker. Switch K3 is included in the protective circuit and serves to de-energize the main relay M, meanwhile depriving the entire system of potential in the event of the operation of these three protective devices. These devices control the energization of the coil K1 of relay K and will now be described in detail.

The overload protective device is indicated at O and includes two normally open switches O3 and O4. These switches are each operated by their own coils O1 and O2. Both of these coils are connected together through a common conductor 188 which is connected to the coil N1 of a relay N. The function of this part of the device will be presently described in detail. Coil N1 is connected through a conductor 189 with two current transformers 190 and 191, which are energized through phases 1 and 3 of the generator line GL respectively. The transformer 190 is connected through a conductor 192 with coil O2 while the transformer 191 is connected through a conductor 193 with the coil O1. When an overload occurs on line GL, sufficient current flows through the coils O1 and O2 to close either or both of the switches O3 and O4. The two switches O3 and O4 are connected in parallel across two conductors 194 and 195. The conductor 195 is connected to a conductor 196 which in turn is connected to coil K1 of relay K. The other side of this coil is connected through a conductor 197 with the common bus 90. The other conductor 194 of relay O is connected to conductor 165.

The other side of switch J5 is connected to the bus 164. When an overload occurs, either or both of switches O3 and O4 are closed which completes a circuit through coil K1 of relay K. This relay as previously described, disconnects the latch from the circuit breaker so as to release the circuit breaker and at the same time deenergizes main relay M.

To prevent the generator 45 from running as a motor which might occur in the event that the exciter potential failed to come up or in the event that power in the line GL should flow toward the generator 45 instead of from it as might occur if the frequency of the distribution line should be increased, the reverse power device, previously referred to, is employed. This device includes a watt meter R which is of the indicating type and which is provided with a potential coil R1 and a current coil R2. Watt meter R also includes two switches R3 and R4 operated through the pointer R5 of the watt meter which are adapted to be closed upon power flowing in the line GL in opposite directions. The current coil R2 of watt meter R is included in a circuit 198 which also includes a current transformer 199 connected in phase 2 of line GL. One side of the potential coil R1 of this relay is connected through a conductor 200 directly to the common bus 90. The other side of this potential coil is connected through a conductor 201 to conductor 144 which in turn is directly connected to the potential side of secondary 117S of transformer 117. The switch R3 of relay R operates to energize coil K1 of relay K and thereby disconnect the generator from the system when the power in line GL flows in reverse direction. By adjusting the particular contact with which the pointer R5 of the watt meter comes in contact to form switch R3 the relay R may be adjusted to perform the same function at a fractional part of the load instead of when the power in the line is reversed. In either case when the system was to be started, the pointer might be disposed so as to close switch R3, which would be the position it would be most apt to be in when it was last in operation. In such case it would be impossible to close circuit breaker C, since the circuit controlling relay K would be closed and the latch circuit open. To guard against this, the switch R4 is employed and before the circuit through R3 can be completed, it is necessary that the pointer move toward the right to close the switch R4. Toward this end, an auxiliary relay Y is employed whose construction and function will now be described in detail:

This relay is provided with a coil Y1, a normally closed switch Y2, and two normally open switches Y3 and Y4. The various switches of meter R and relay Y are connected as follows. The switch R4 is connected through a conductor 202 with the coil Y1. This coil is connected through conductor 203 with the common bus 90. A conductor 204 connects one side of the switch Y4 with the conductor 202. The pointer R5, operating between switches R3 and R4, is connected through a conductor 205 with the conductor 194 previously referred to and which controls the relay K1. A conductor 206 connects the other side of the switch Y4 with the conductor 205. Switch R3 is connected through a conductor 207 to one side of the switch Y3. The other side of this switch is connected through a conductor 208 with the conductor 195. The operation of this device is as follows. Assuming the pointer R5 in its normal position, which might be midway between the two contacts of switches R3 or R4 or in contact with switch R3. A circuit through switch R3 normally would be broken through switch Y3. It hence becomes necessary to operate relay Y before this circuit can be closed to permit the reverse power or fractional power feature to come into operation. When the circuit breaker is cut in and the generator 45 delivers power, the pointer R5 of watt meter R moves to the right through the action of the current coil R2 and the potential coil R1 thereof closing switch R4. A circuit may now be traced as follows. Commencing with conductor 194 which is connected through switch J5 and through bus 164 with secondary 60S of transformer 60, current flows through conductor 205 through switch R4 through conductor 202 through coil Y1 and through conductor 203 back to the common bus 90. This energizes relay Y opening switch Y2 and closing switches Y3 and Y4. The switch Y4 shunts switch R4 and serves to maintain the relay Y closed. The closing of switch Y3 now completes the circuit including conductors 205, 207 and 208 excepting through switch R3. When the power reverses or reaches the predetermined minimum, pointer R5 operates to close switch R3, which, the same as in case of the overload device O, energizes the coil K1 of relay K and operates this relay to de-energize the main relay M and the latch relay L. The entire system is thus de-energized and the generator stopped.

In the operation of the plant, it frequently occurs that trash accumulates upon the trash rack or grating to such an extent as to lower the elevation of the water within the flume leading down to the water wheel. When such conditions occur, it becomes desirable to shut down the plant until the trash has been removed and a full head of water again be procured. For this purpose, I employ a float 213 which is disposed within the flume between the trash grating and the water wheel. This float carries an arm 214 which is adapted to engage stops 215 and 216 on two movable rods 218 and 219. The rod 218 is adapted, when the stop 215 thereon is engaged, to open a switch 31 while the rod 219 is adapted to open a switch 32 when the arm 214 engages stop 216. Of these two switches, switch 32 serves to shut down the plant when the water level drops a sufficient amount as determined by the stop 216. One side of switch 32 is connected through a conductor 78 with switch F2 of relay F forming a part of the protective circuit while the other side of this switch is connected to conductor 77 through conductor 209, conductor 77 being also in the protective circuit. When the float 213 reaches its lowermost position, switch 32 is opened and the protective circuit broken which de-energizes a main relay M thereby depriving the system of control current. This de-energizes latch relay L unlatching the circuit breaker C which returns to normal position and disconnects the generator. At the same time solenoid 10 is de-energized which causes the governor to cut off the water supply and stop the water wheel.

After the generator has been synchronized and the circuit breaker closed, the governor is automatically adjusted to cause the generator to take on load. This is accomplished through the solenoid 11 which operates to increase the spring pressure on the fly balls and to cause the gate to open and furnish sufficient water to the turbine to cause the generator to take the desired load. This solenoid is connected to the common bus 90 through a conductor 158 and to the switch J4 through two conductors, 156 and 157. The circuit for operating the solenoid 11 may be traced as follows. Commencing with bus 66, leading from transformer 59, the current flows through bus 66B through switch J4, through conductor 156, through conductor 157, through solenoid 11, through conductor 158 and back to the common bus 90. This alters the pressure on the spring acting against the fly balls and causes the cross head 99 to move to the right opening the gate controlling the flow of water to the turbine. Such movement is limited by the setting of certain stops arranged on the governor for such purpose, which have not been shown in the drawing, but are well known in the art.

As previously brought out, the operation of certain of the devices of the invention is accomplished by impressing different voltages upon the control line 65 to cause various potential relays to become operative, said relays operating at different potentials. For this purpose the resistance 86, previously referred to, is employed. This resistance is connected in a circuit 161, which is connected to the primary 56P of transformer 56. The circuit 161 also includes the secondary 57S of transformer 57 and a manually operated switch 184, by means of which the said circuit may be opened and the entire control system deprived of energy. The resistance 86 is divided in sections, which may be independently shunted through switches 82, 83, 84 and 85, previously referred to, whereby different voltages may be impressed upon the control line 65 and the various potential relays controlled by the potential of the control line operated.

The share of the load taken by the generator and contributed to the distribution system is automatically controlled and the apparatus for producing the desired results will now be described in detail: For this purpose, a watt meter W is employed which operates in a manner to limit the gate opening and the consequential delivery of power by the generator 45. This watt meter is responsive to the local demand and may be adjusted to cause the generator 45 to deliver a maximum amount of power when the local demand is greatest as during a peak and to deliver a minimum amount of power when the demand is least. As previously brought out, the local load is served by line SL and the current preferably furnished by generator 45. When generator 45 is unable to supply the demand, additional power is procured from the line DL. The watt meter W is of the indicating type having a current coil W2, a potential coil W1, two fixed contacts and a movable pointer forming two switches W3 and W4 adapted to be alternately operated. The current coil W2 of watt meter W is connected in a circuit 170 including a current transformer 171 on phase three of the distribution line DL. The potential coil W1 of the said watt meter is connected in a circuit 172 connected across the bus 164 and common bus 90 which lead from the secondary 60S of transformer 60. The watt meter W, as stated, is of the indicating type and the construction thereof is such that its pointer moves toward the left when current flows from the distribution system to take care of the local demand and so that said pointer moves toward the right when current is being delivered by the generator 45 to the distribution system. The watt meter W1 functions through a potential relay X and is set in by operation by closure of one of the switches 82 to 84. Assuming now that the generator 45 is feeding back current into the distribution line DL, it would hence become desirable to reduce the load upon said generator to reserve the water for a time when the demand on the line SL would require it. In such case, the pointer of the watt meter W would move toward the right and close switch W4. This relay comprises a potential coil X1, two fixed contacts and a movable pointer forming two switches, X2 and X3. These various parts are connected as follows: The current coil X1 of relay X is connected through two conductors 227 and 163 with the bus 66 and with the common bus 90, being thereby connected to the control line 65 through transformer 59. The pointer of the relay X is connected through a conductor 165 with switch J5 of relay J, which is in turn connected to the bus 164 from transformer 60. The other side of the switch X2 is connected through conductor 173 with switch W3, while the other side of switch X3 is connected through conductor 166 with the pointer of the watt meter W. The other sides of switches W3 and W4 of watt meter W are connected through two conductors 169 and 167 with the two limit switches 70 and 71, controlling the operation of the motor 73. Motor 73 is further connected through conductor 168 with the common bus 90.

The operation of the watt meter W and relay X are as follows: Assuming further that the switch 83 serves to operate the potential relay X to throw the swinging pointer thereof to the right, the introduction of the section of the resistance 86 in the circuit 161 by closure of switch 83 impresses a voltage on transformer 56 through the secondary 56S thereof dependent upon the value of this section of the resistance. This voltage is transmitted through the control line 65 and is impressed upon primary 56P of transformer 59, which energizes coil X1 of relay X. As stated when the potential is sufficient, this coil serves to move the pointer of the potential relay X toward the right, closing the switch X3. The following circuit may then be traced. Commencing with the secondary 60S of the transformer 60, current flows through bus 164, through switch J5 which is closed when the circuit breaker is closed, through conductor 165, through switch X3, through conductor 166, through switch W4 (which was assumed to be closed), through conductor 167, and through the limit switch 71, through motor 73 and through conductor 168 back to the common bus 90. This operates motor 73 in the proper direction to lower the limit device of the governor through the gears 250, 249 and threaded shaft 247, closing the gate and permitting the generator to take less load. If the switch W3 were closed instead of switch W4, the same circuit would be completed through conductor 166, switch W3, conductor 169, limit switch 70, motor 73 and back through conductor 168 to the common bus 90. This would rotate the motor 73 in the opposite direction and raise the limit device of the governor to open the gate and permit the generator to take on more load.

In the event that it be desired to control the load taken by the generator 45 independently of the watt meter W, the same can be accomplished through the potential relay X by closing contact X2 thereof. For this purpose another of the switches 82 to 85 would be employed which may be the switch 84. This switch cuts in a further section of the resistance 86 and varies the potential across the potential coil X1 of said relay X, to swing the pointer thereof to the left and close switch X2. This provides a direct connection through conductor 173 between conductor 169 and conductor 165 eliminating both switches X3 and W3. The motor 73 may now be operated independently of watt meter W to cause the generator to take on load as determined by the limit switch 70.

In the operation of power plants, it is frequently desirable to be able to cause the power plant to handle a predetermined part of its usual load. This is accomplished through the potential relay Z. This relay comprises a potential coil Z1, a fixed contact and a movable contact which form a switch Z2. An examination of the circuits of this relay show that the potential coil Z1 is connected in a circuit 174 which is connected to the secondary 59S of transformer 59 through busses 66 and 90. The switch Z2 of this relay is connected through a conductor 177 with the conductor 176 which in turn is connected to the switch M9 of relay M. Switch Z2 is further connected through a conductor 178 with solenoid 74, which in turn is connected through a conductor 179 with the common bus 90. When the particular switch of the switches 82 to 85 used for controlling relay Z is closed to cut in the proper portion of the resistance 86, coil Z1 becomes sufficiently energized to close switch Z2. This completes the following circuit. Commencing with conductor 164 connected to the secondary 60S of transformer 60, current flows through switch M9 on master relay M, through conductor 176, through conductor 177, through switch Z2, through conductor 178, through solenoid 74 and through conductor 179 and back to the common bus 90. Actuation of solenoid 74 raises the limit lever of the governor a sufficient amount to bring about the resetting of the gate and the assumption of the predetermined portion of the load desired by the generator.

In order to shut down the station by remote control after the generator has been in normal operation, and without opening the circuit breaker when there is a load on the generator, I employ a no-load relay N which is in the nature of a watt meter. This relay is provided with a current coil N1, a potential coil N2, and a switch N3 adapted to be closed by a pointer N4. The potential coil N2 is connected in a circuit 209 which is directly connected across the conductors 118 and common 90 leading from the secondary 117S of transformer 117. The current coil N1 as previously described is connected in series with the two current transformers 190 and 191 in parallel and the two coils O1 and O2 of relay O in parallel. The relay N is so designed that when the generator is not taking load that contact N3 is closed. As the generator 45 produces power and takes on load, the current in the transformers 190 and 191 energize the coil N1 and cause the pointer N4 to move toward the right, opening the circuit through a conductor 210 with the conductor 194, previously referred to, which in turn is connected through switch J5 with the secondary 60S of the transformer 60. The other side of the switch N3 is connected through a conductor 211 with switch M8 of master relay M. The other side of this switch is connected to a conductor 212 which in turn is connected to the conductor 195 and with the common bus 90 through coil K1. When the system is being started, switch M8 is closed, but the same circuit is opened through switch J5 so that upon starting, relay N is inoperative. However, in the subsequent connection of the generator to the system, switch M8 becomes opened as the master relay M is operated and following this, switch J5 in the same circuit becomes closed through operation of coil J1 when the circuit breaker C is finally closed. This leaves the circuit open through both of the switches N3 and M8. If at any time, it is desired to shut down the generator 45, it is merely necessary to pull switch 185. The remote control current is then cut off from the remote control line which de-energizes transformer 59. This immediately de-energizes solenoid 10 which operates the limit arm of the governor 100 to cause the governor to close the gate and shut down the generator. At the same time, switch M is de-energized which closes switch M8. A circuit through switch M8 and N3 is still open, however, through switch N3 and only when the generator 45 reaches no-load will the switch N3 be closed and the circuit completed. Upon closure of both of these switches, relay K is energized which further opens the main relay feeding circuit and also opens the latch circuit releasing the latch and permitting the circuit breaker to open. In this manner the circuit breaker does not open until current ceases to flow through the same, thereby preventing arcing and avoiding strain on the generator and other equipment.

For regulating the voltage of the generator 45, a voltage regulator V is employed which may be of any standard design. In the wiring diagram, an ordinary vibrating type voltage regulator has been illustrated which is provided with vibrating contacts indicated at V2 and with a coil V1 which controls the operation of the vibrating contacts V2. Such construction being well known in the art, the same has not been illustrated in detail.

In conjunction with the regulator V, two relays VA and VB are employed, which are adapted to shunt two resistances 35 and 36. Relay VA is provided with a coil VA1 and a normally open switch VA2 and relay VB is provided with a coil VB1 and a normally open switch VB2. The coils of these relays have different windings so that said relays become actuated when currents of different value flow through these coils.

The coil V1 of voltage regulator V is connected through a conductor 281 with the bus 118 from transformer 117 and is further connected through a conductor 282 with the common bus 90. The vibrating contacts V2 of this voltage regulator are connected through a conductor 113 with the coils VB1 and VA1 of relays VB and VA in series and through a conductor 112 with the switch VA2 of relay VA. This switch is connected to resistance 36 through a conductor 284, which in turn is directly connected to conductor 113. The conductor 112 is further connected through a conductor 283 to switch VB2, which in turn is connected through a conductor 285 to the resistance 35. By means of this arrangement, the two resistances 35 and 36 are connected in parallel to one another and with rheostat 38 and are both in series with the shunt exciter field coil 51. In the operation of the voltage regulator, the vibrating contact V2 shunts the rheostat 38 so as to give the desired voltage regulation. The resistances 35 and 36 when cut in serve to shunt a portion of current ordinarily going through the vibrating contacts V2 of regulator. By use of these resistances, a smaller amount of current is sent through the vibrating contact V2 than would otherwise be the case, thereby improving the operation of the system and preventing failure through excessive flow of current through the vibrating contacts. The two coils VA1 and VB1 of the two relays are connected in series and in the circuit of the shunt exciter field coil 51. These coils are adapted to actuate the respective relays of which they form a part depending upon the predetermined amount of flow of current therethrough. As noted, coil VA1 has a larger number of turns than coil VB1. It will also be noted that switch VA2 controlled by relay VA connects in series with resistance 36. When current passing through the shunt field coil 51 reaches a certain amount, resistance 36 is automatically cut in shunting part of the current which would otherwise flow through the contacts V2. As the current through the shunt field coil further increases, relay VB is similarly energized cutting in resistance 35 and still further cutting down the current passing through the vibrating coil V2.

For the purpose of advising an attendant at the control station of what is taking place in the sub-station both during synchronizing and after the plant is in normal operation, an indicating system is employed. This indicating system relies on the current used by the various apparatus to apprise the attendant of what is taking place, and utilizes the remote control circuit. For this purpose, an ammeter 80 is provided, which is connected in series in the starting circuit 161 with the other equipment therein. This ammeter has a special coil which is calibrated and marked to indicate the various occurrences in the sub-station. The scale of this ammeter is shown in Fig. 2. From an inspection of Fig. 2, it will be noted that when load is placed upon the secondary 59S of transformer 59 through the various coils M1, A1 of relays M and A and solenoids 10 and 11, in addition to other devices to be presently described, such load is stepped up through the transformer 59 and transmitted through the control line 65 to transformer 56 where the same is stepped down and impressed upon the circuit 161. This load registers upon the ammeter 80 indicating just how much current is flowing in the control circuit. When the starting switch 184 is first closed, coils H1, X1, and Z1 of the relays H, X and Z are immediately energized by the remote control circuit. The load produced by these coils cause the pointer of the ammeter 80 to move to a point indicated at 278 on the dial. As soon as one of the switches 72, 28 or H2 is operated, the circuit is established through the protective circuit and the coil M1 of main relay M energized. This places a load across the secondary 59S of transformer 59. Through the secondary 57S of transformer 57 current flows in the remote control circuit 161 proportional to the load brought about in the closing of the protective circuit. This causes the ammeter 80 to register and the said ammeter is marked as indicated by numeral 262. As the system continues to function, relay A is closed and the coil A1 thereof is connected across the remote control circuit placing a further load upon the secondary 59S of transformer 59. This causes the further movement of the pointer of the ammeter 80 which reaches a second mark on the scale designated by the reference numeral 263. When the coil 10 is operated, it starts the governor to action. Further load is placed on said transformer which causes the pointer thereof to move up to point 264. After solenoid 10 has been operated, the governor is set into operation and the generator started. As soon as the generator gets up to speed, the fly balls of the governor are brought into operation and switch 43 closed. This starts into action the synchronizing mechanism of the invention.

In conjunction with the two coils 14 and 15 of the synchronizer proper a resistance 16 is employed which is connected to the conductor 128 through a conductor 265. This resistance is further connected to the bus 66. Inasmuch as potential for operating coil 14 is derived from transformer 60, these potentials oppose one another and cause a variable current to flow through the said resistance and consequently through the circuit 161. This causes the pointer of the ammeter 80 to move between points 264 and some other advanced point on the scale. By the selection of the proper value of resistance 16 this point may be made to occur at the end of the scale as designated by the numeral 267. In this manner the synchronizing of the generator with the distribution system can be accurately observed at the control station, the pointer of the ammeter 80 swinging much the same way as the ordinary indicating synchroscope or dark and light lamps used in synchronizing. After the generator has been synchronized and connected to the distribution line, switch S3 and switch S2 on relay S of the synchronizing device open as previously explained to disconnect the synchronizer mechanism and also disconnect the resistance 16 from the remote control circuit. The pointer of ammeter 80 then returns to position 264.

After synchronism the generator is caused to take on load by energization of solenoid 11. This causes the pointer to move up to a point 268 on the scale of the ammeter corresponding to the additional current required by this coil. Inasmuch as the circuit including conductors 156, 157 and 158 and solenoid 11 are controlled through switch J4, the solenoid 11 cannot be operated until relay J is closed. Relay J cannot be closed until the circuit breaker C is closed. It hence becomes evident that the movement of the pointer up to position 268 is also indicative of the fact that the circuit breaker has been successfully closed.

In the operation of the sub-station, it becomes desirable to know the height of the head water in the mill pond. For this purpose a float 269 is employed which is provided with a member 270 adapted to operate a movable contact 271 engaging a variable resistance 12. The amount of resistance cut in depends upon the position of the float 269. One side of the resistance 12 is connected through a conductor 272 with the common bus 90. The adjustable contact 271 is connected through a conductor 273 with another conductor 274. This conductor is connected to switch 31 which in turn is connected to a conductor 275. This conductor is connected to a switch 42 which in turn is connected to a conductor 276 with conductors 156 and 157 previously referred to. By means of the circuit starting with bus 66B which includes switch J4, conductor 156, conductor 276, switch 42, switch 31, conductor 274, conductor 273, resistance 12, conductor 272 back to the common bus 90 a circuit is established through resistance 12 which creates a load upon the remote control circuit and causes a further movement of the pointer of the ammeter 80. This circuit is normally closed through contact 31 which only becomes open in the event that head water within the flume drops below a certain elevation due to trash gathering on the trash grates. The circuit, however, is normally open through switch 42 but becomes closed when the cam 159 engages roller 256. This occurs when the generator has taken on load. The operation of the pointer beyond position 268 after synchronization hence indicates that the generator has taken load. Furthermore the position of said pointer beyond point 268 indicates the exact elevation of the head water in the mill pond. By selecting the proper value for resistance 12 the entire range of head water desired to be indicated can be made to read between points 268 and 267. For this purpose a separate scale 279 may be employed which may be calibrated to read directly any elevations.

With my improved system of indicating the conditions in the sub-station, an attendant at the control station may be apprized of what is taking place in the power plant without being actually present. When the sub-station is completely shut down the pointer of the ammeter 80 returns to zero indicating that there is no current in the control circuit and none of the circuits in the sub-station are energized. Inasmuch as both of the switches 31 and 42 are in series in the circuit containing resistance 12, it will become apparent that failure of the ammeter to show headwater elevation would indicate that one or the other of these switches was open. This would mean that either the water in the flume had dropped to too low an elevation due to gathering of trash on the trash grates or that the generator had failed to take on load. In such case, it might be desirable to be able to see whether or not the elevations of the head water of the mill pond was sufficient to operate the generator under load or whether the water had dropped in the flume due to absence of water in the mill pond. For this purpose, the contact H3 on potential relay H is employed. By opening all the switches 82, 83, 84 and 85 the entire resistance 86 is cut into the starting circuit 161. Coil H1 is so designed that when all of the resistance is cut in, switch H3 is closed. This switch is connected through a conductor 279 with conductor 273 and is further connected to a conductor 227 with bus 66. This circuit forms a shunt circuit shunting both switches 31 and 42 permitting the attendant at the control station to ascertain the elevation of the water in the mill pond.

A relay TA is provided with a coil TA1, a normally closed switch TA2 and a normally open switch TA3.

Operating in conjunction with relay TA, another relay TB is employed which includes a coil TB1 and a single normally open contact TB2. The coil TA1 of relay TA is connected with bus 164 through a conductor 335 and is further connected through a conductor 336 with a switch 52, which is normally closed. From switch 52, a conductor 337 leads to the common bus 90. A circuit 338, shunting the switch 52 contains the switch TB2 of relay TB. This switch is normally open. This circuit commences at common 90 and leads to conductor 336. The coil TB1 of relay TB is connected in a circuit 339 which is connected to the common bus 90 and to the bus 66. The transformer 60 being permanently connected to the distribution line DL furnishes current for the coil TA1 of relay TA so that the switch TA2 is closed as long as the distribution system is in operation. This maintains contact TA2 closed and establishes a circuit through line 65.

To prevent an attendant at the sub-station from opening the control circuit while the control line is in use for control purposes by opening switch 52, the relay TB is employed. As brought out, circuit 339 is connected across busses 166 and 90 which are fed from the transformer 59. This transformer becomes energized upon the closing of the control circuit 65 and as soon as energy is provided to these busses, coil TB1 becomes actuated closing switch TB2. Switch TB2 shunting switch 52 maintains the circuit through relay TA closed and hence maintains contact TA3 closed. The opening of switch 52 hence does not open the control line 51 to cause the plant to shut down.

In the operation of the invention, assuming that the sub-station is shut down, the position of the various switches and contacts will be as illustrated in the drawing. To start the sub-station, switch 184 is first closed. At the same time switch 82 is closed. This completes circuit 161. This completes a circuit through the control line. Upon closure of these switches, current flows through the primary 56P of transformer 56, through switch TA4 which is normally closed, through switch 28, the primary 59P of transformer 59. When a load is placed upon transformer 59 either through the time operated device 72 or the potential relay H as presently described, a corresponding load is placed upon the secondary 56S of transformer 56. By selecting the proper switch of the switches 82, 83 and 84, a certain amount of resistance 86 is cut into the circuit. This circuit receives its energy from the transformer 57 through the primary 57S thereof and a certain voltage is impressed upon secondary 56S of transformer 56 depending upon the resistance 86 and the other constants in this circuit. The voltage impressed upon the transformer 56 is transferred through the distribution line and the circuit 65 to primary 59P of transformer 59. By employing switch 82 all of the resistance 86 is shunted and the various potential relays normally operated thereby are rendered inoperative. In such case, the time controlled switch 72 alone functions. When the proper time of day is reached the time controlled switch is closed which completes the protective circuit which may be traced as follows. Commencing with the bus 66 leading from the secondary 59S of transformer 59 the current flows through circuit 226 connecting said switch with said bus, switch 72 through conductor 66B, through conductor 67, through switch A2 which is normally closed, through conductor 68, through switch B2 of relay B which is also normally closed, through conductor 69, through conductor 75, through switch 41 operated by the governor cross head 99, which switch is also normally closed, through conductor 76, through switch J3 also normally closed, through conductor 77, through switch 32 and through conductor 78. As soon as station control current is on, relay F is energized and switch F2 is closed. Assuming that station current is available, current continues from conductor 78 and flows through switch F2, through conductor 79, connecting switch F2 with switch K3, through switch K3, through conductor 87, through switch 27, through conductor 88, through coil M1 of master relay M, through conductor 89 and back to the common bus 90. The switch F2 is a normally open switch, however, when the system is in condition to be rendered operable, local control current passes through the coil F1 thereof and maintains said switch closed so that the circuit may be completed to operate the coil M1 of master relay M. The actuation of master relay M closes a plurality of circuits, a number of which have been previously described. One of these circuits indicated at 93 includes the switch M4 which shunts switch A2 and which serves to maintain the relay M closed throughout the subsequent operation of the system as previously explained. Upon closure of switch M3, a circuit may be traced from the potential side 66 of transformer 59 through bus 66B, switch M3, through conductor 94, through solenoid 10, through conductor 95 and back to the common 90. This releases the control mechanism 98 which opens the governor valves and subjects the governor cylinders to the oil under pressure. The cross head 99 of the governor 100 now travels toward the right as viewed in the drawing turning the gate shaft 101 and opening the gate which controls the flow of water to the prime mover 102. This operates generator 45 which, as soon as sufficient speed has been maintained, energizes the generator line GL. The generator drives the fly balls in the governor which in turn control the operation of the cross head 99 in the customary manner to maintain the generator at proper no-load speed. Another of the circuits closed by relay M is designated at 105—106 which includes the switch M2. Starting with the exciter armature 49, a circuit may be traced through conductor 107, through conductor 108, through conductor 106, master relay switch M2, conductor 105, conductor 109 and up to rheostat 38. At the rheostat 38, the current divides, part passing through said rheostat through a shunt circuit 110 and the remainder passing through a main circuit 111. The current passing through the main circuit 111 passes through a conductor 112, through the vibrating contact V2 of voltage regulator V, through conductor 113, through coils VB1 and VA1 and relays VB and VA through conductor 114 and through the shunt field 51 of the exciter 48. The conductor 115 connects the shunt field 51 to the series field 50 which is connected through conductor 116 with the other side of the armature 49 of the exciter 48. This completes a circuit through both the shunt and series fields of the exciter which energizes the field of the generator causing the same to generate current and deliver alternate current to the line GL. The voltage regulator V operates in the usual manner to control the potential of the generator 45. Resistance 37 is an auxiliary resistance cut in series with the rheostat 38 for reducing the voltage of the exciter when the exciter is being shut down. This resistance is normally shunted by the switch M2 during the normal operation of the exciter. After the line GL has become energized, transformer 117 is provided with potential. Both the generator line and the distribution line are now live and the various synchronizing circuits may then be operated as previously described. Following synchronization the various other steps of the starting and control of the system are automatically carried out as described in connection with the individual apparatus and features of the invention.

The advantages of my invention are manifest. The system is fully automatic, so that the power plant may be started and operated under all conditions by remote control. The attendant at the control station is at all times apprised of the condition of the plant, both during the starting thereof and during the operation thereof after starting. By means of the various protective devices employed and the master relay used, the system will automatically shut down and at the same time advise the attendant at the control station in the event that a failure occurs or in the event that some device or apparatus fails to function. It is practically impossible with my system to cause injury to the generator or other apparatus associated therewith. The system automatically takes on load after the generator has been connected to the distribution system and the proportion of the load can be varied to meet with the requirements of the system. The system may be economically installed, the control circuit using but a single conductor.

Changes in the specific form of my invention as herein disclosed may be made within the scope of what is claimed, without departing from the spirit of my invention.

Having described my invention, what I claim as new and desire to protect by Letters Patent is:

I claim:

1. In combination with a generator, a master relay including a plurality of switches and an operating coil, circuits including said switches and controlling the actuation and operation of the generator, a circuit for actuating said master relay including the coil thereof, an anti-start relay including a normally closed switch and a coil, a control circuit for actuating said master relay, said circuit including the coil of said master relay and said normally closed switch, a normally open switch on said master relay, a circuit including said switch and shunting the normally closed switch on said anti-start relay, a normally open switch on said master relay, a circuit from said control circuit including the normally opened switch on said master relay and the coil on said anti-start relay, said last named master relay switch operating said anti-start relay to open the normally closed switch on said anti-start relay, and a maintaining circuit for said anti-start relay energized from the control circuit and closed by said anti-start relay.

2. The combination with a generator and a distribution system, of a main switching means for connecting the generator to said system, speed matching means for controlling the operation of said generator, synchronizing devices connected to said system and generator for operation thereby, means controlled by said synchronizing means for closing said main switching means within a predetermined range of frequency and phase differences, a control circuit extending to all said means, each said means including an actuating device responsive to a voltage on said control circuit which is different from the voltage required for any other said means, and a manually operable device for imposing different voltages on said control circuit for accomplishing a selective operation of said means.

3. The combination with a generator and a distribution system, of main switching means for connecting said generator to said system, synchronizing means operative within a predetermined range of frequency and phase differences of said generator and system for closing said main switching means, a master relay including a plurality of normally open switches and an operating coil, energizing circuits including at least one of said master relay switches for controlling the operation of the generator and synchronizing means, an anti-start relay including a normally closed switch and an operating coil, a control circuit for actuating the coil of said master relay and including said normally closed switch of the anti-start relay and at least one safety switch held normally closed when conditions are proper for the operation of said generator, a branch circuit from said control circuit including another normally open switch of said master relay and the coil of said anti-start relay, said last-named master relay switch operating to close said anti-start relay to open the normally closed switch on said anti-start relay, and a maintaining circuit for said anti-start relay energized from the control circuit and closed by said anti-start relay.

4. The combination with a generator and a distribution system, of main switching means for connecting said generator to said system, synchronizing means for operating said main switching means within a predetermined range of frequency and phase differences, an energizing circuit for said synchronizing means, a time-delay switch in said energizing circuit for opening said energizing circuit after a predetermined length of time, and means for rendering said time-delay switch inoperative for opening said circuit when the operating conditions of the generator have been completed within said predetermined length of time.

5. The combination with a generator and a distribution system, of main switching means for connecting said generator to said system, a master relay for controlling the operation of said generator and said main switching means and having an actuating coil, independent first and second sources of electrical current, an energizing circuit for said actuating coil, and a control relay having a control coil and a switch for closing said energizing circuit when current from said first source flows through said control coil, said energizing circuit being connected to said second source and including said master relay coil and at least one normally closed protective device for opening said control circuit when said generator should not be operated, whereby current from both said sources is utilized for the closing and maintaining closed of said main switching means and failure of current from either source prevents connection of the generator to the system or provokes a disconnection of it from the system.

6. The combination with a generator and a distribution system, of main switching means for connecting said generator to said system, an exciter for the field of said generator, a master relay including a switch closed thereby, a closing circuit from said master relay switch to said main switching means, latching means for holding said main switching means closed, a maintaining circuit from said exciter through said master relay switch for holding said latching means in operative position while said exciter is delivering current to said generator field above a predetermined value, and means for returning said main switching means to open position when said maintaining circuit releases said latch.

7. The combination with a generator and a distribution system, of main switching means for connecting said generator to said system, a watt meter energized by said generator, a switch operated by said watt meter to be maintained open while said watt meter is energized by said generator and to close when said watt meter is no longer energized by said generator, means for opening said main switching means, a control circuit for said opening means, a master relay including a plurality of switches, one of said switches operating to control the operation of said generator and another of said switches being included in said control circuit for preventing the opening of said main switching means while the master relay is closed, said watt meter operating also to open said control circuit when the generator ceases to deliver power.

8. The combination with a generator and a distribution system, of main switching means for connecting said generator to said system, a control station remote from said generator and switching means, a control circuit extending from said control station, selecting means at said control station for delivering a continuous electric current of selected predetermined voltage to said control circuit, means adjacent said main switching means and selectively responsive to the voltage on said control circuit for selecting a predetermined operation of said generator and for energizing said main switching means and including a plurality of relays, one of said relays being a master relay for controlling the operation of said generator, a branch of said control circuit providing an energizing circuit for said master relay, protective switches in said energizing circuit responsive to predetermined operating conditions of said generator for opening said energizing circuit and thereby rendering said master relay inoperative, a lock-out system for maintaining said master relay inoperative when it has been rendered inoperative by the opening of one of said switches, said lock-out system including another of said relays and means included in said selecting means for releasing said lock-out system from said control station.

9. The combination with a generator and a distribution system, of main switching means for connecting said generator to said system, a master relay for controlling the operation of said main switching means and said generator, a remote control circuit for energizing said master relay, at least one circuit-opening protective device responsive to the conditions of operation of said generator, circuit means including said device and said relay whereby the opening of said protective device de-energizes said master relay, a protective relay for controlling the initial energization of said master relay from said remote relay circuit, and means operated by said protective relay and connected to said remote control circuit so that said protective relay prevents the further operation of said master relay until said remote control circuit has been de-energized.

10. The combination in an electrical system including two sources of alternating current which are to be connected together, of main switching means for connecting said sources, a control circuit, control devices for controlling the frequency of at least one said source and including a plurality of separate instrumentalities for successive operation, each said operating means including an actuating device responsive to a voltage on said control circuit which is different from the voltage required for any other said actuating device, all said devices being connected to the control circuit, a device for imposing different voltages on said control circuit for accomplishing a selective operation of said operating means, and other means connectible to said sources and to said switching means for closing the latter.

11. The combination with a generator and a distribution system, of main switching means for connecting said generator to the system, a control circuit, manual means for closing said control circuit, a relay operable by said control circuit, a further circuit closable by said relay for closing said main switching means, automatic means for operating said relay to open said further circuit, means including a circuit for holding said relay open when opened by said automatic means, and devices operable by said control circuit for returning the relay to closed position when held open by said holding means.

12. The combination with a generator and a distribution system, of main switching means for connecting said generator to said system, means operative for actuating and controlling the operation of the generator, control means for first energizing said actuating and controlling means and thereafter energizing said switching means when the generator is ready for connection to the system, and a timing device connected with said control means and actuated for measuring a predetermined period of time from the moment of energization of said actuating and controlling means, and operating to interrupt the energization of said actuating and controlling means if the generator has not been prepared for connection during said period of time.

13. A combination as in claim 12, and including means for preventing the interruption of the energization of said actuating and controlling means by said timing device when said main switching means has been closed during said period of time.

14. The combination with a generator and a distribution system, of main switching means for connecting said generator to said system, means operative for actuating and controlling the operation of the generator, and control means for energizing said actuating and controlling means, said control means including devices controlled by said switching means and said actuating and controlling means and operating for de-energizing said actuating and controlling means when the actuation of said generator exceeds a predetermined limit.

15. In combination a generator and an electrical power system, switch means for connecting said generator to said power line, control means for said switching means including means operative to effect the closing of said switching means for connecting said generator and power line at a predetermined rate of speed of said generator, means for rendering said control means operative, and means operatively connected with said control means and said switch means for rendering said control means inoperative when the rate of speed of said generator exceeds predetermined limits.

16. In combination with two alternating current power lines, switch means for connecting said lines, control means for said switch means and responsive to the electrical frequency conditions of said power lines and including devices connected and arranged to effect the closing of said switch means to connect said power lines during a predetermined range of frequency difference, means for rendering said control means operative, and means operatively connected with said control means and said switch means for rendering said devices inoperative when the rate of frequency difference between said power lines exceeds predetermined limits.

17. The combination in a control system of a control circuit, a master switch and a control switch, means energized from the control circuit for simultaneously initiating the closing of said switches, means for delaying the operation of said control switch to effect the prior closing of said master switch, a second circuit including operating means arranged to become effective to open said master switch when a predetermined condition prevails, means for effecting the operation of said control switch after the actuation of said master switch, said control switch being connected with said second circuit and arranged to prevent said master switch from closing after being opened by said operating means prior to the opening and closing of said control circuit.

18. The combination of two sources of electrical current, switch means for connecting said sources together, control means for said switch means and means for energizing said control means to effect the closing of said switch means, and timing means operatively associated with said control means prior to the closing of said switch means for rendering said control means ineffective to close said switch means after a predetermined time.

19. A combination as in claim 18, and including means for rendering said timing means effective when the switch means is closed.

20. In combination with two alternating current power lines, switching means for connecting said lines together, control means for effecting the closing of said switching means, a control circuit, means energized through said control circuit for rendering said control means effective, and means connected and arranged to be effectively energized in accordance with the voltages incident to said power lines for controlling the potential in said control circuit in accordance with the relation of the phase and frequency difference in said power lines after said control means have been rendered effective by said control circuit and before said power lines are effectively connected together.

21. The combination of two sources of electrical current, switch means for connecting said sources together, and a control system for said switch means including a control circuit, control means for effecting a predetermined operation of said device within a predetermined time, and means operatively connected with the control means to lock out and prevent the operation of said control means after said predetermined time, and further means effectively controlled through said control circuit for releasing said lock-out means.

22. A combination as in claim 21, and including means in the control system for testing the frequency relations between said sources, and operating for controlling the voltage in said control circuit.

ERICK PEARSON.